Figure 1:
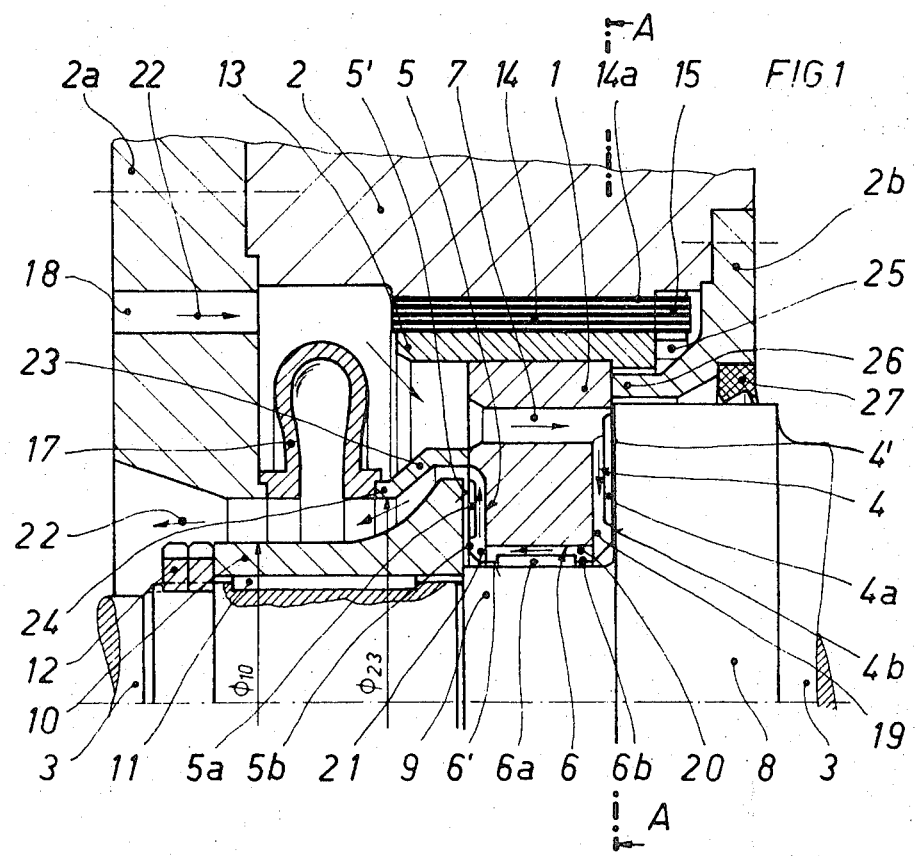

United States Patent [19]
Horler

[11] 3,827,770
[45] Aug. 6, 1974

[54] HYDRODYNAMIC COMBINED AXIAL AND RADIAL BEARING

[75] Inventor: Hansulrich Horler, Zurich, Switzerland

[73] Assignee: Brown, Boveri & Company Limited, Baden, Switzerland

[22] Filed: May 23, 1973

[21] Appl. No.: 363,111

[30] Foreign Application Priority Data
June 9, 1972 Switzerland.......................... 8591/72

[52] U.S. Cl. ............................................. 308/160
[51] Int. Cl. ........................................... F16c 17/00
[58] Field of Search.......................... 308/160, 9, 168

[56] References Cited
UNITED STATES PATENTS
3,393,947  7/1968  Sandy, Jr. ........................... 308/160

Primary Examiner—Charles J. Myhre
Assistant Examiner—Frank Susko
Attorney, Agent, or Firm—Pierce, Scheffler & Parker

[57] ABSTRACT

A rotatable shaft structure and hydrodynamic combined thrust and radial bearing therefor includes an annular bearing disc surrounding the shaft and supported within the bearing housing in a radially elastic manner between two axially spaced collars located on the shaft. Thrust bearings are provided between each collar and the corresponding side of the bearing disc and a radial bearing is provided between the shaft and the inner periphery of the bearing disc. The bearing disc is spring loaded in the direction of one of the thrust bearings, and initially cool lubricating oil is caused to flow through all three bearings in series, the oil first passing radially inward through the lubricating gap at the thrust bearing against which the bearing disc is spring loaded, thence axially through the radial bearing and finally radially outward through the lubricating gap or the other, non-loaded thrust bearing.

6 Claims, 2 Drawing Figures

PATENTED AUG 6 1974 3,827,770

HYDRODYNAMIC COMBINED AXIAL AND RADIAL BEARING

The present invention relates to an improved construction for a hydrodynamic combined axial and radial bearing for fast-running shafts, such as a turbocharger, the bearing disc of which is located in a housing and with radial freedom of movement, the radial and axial sliding faces of the bearing being provided with lubricating slots, tapered recesses and contact surfaces.

An axial thrust bearing is known in which the bearing body is an integral two-sided thrust collar, the thrust collar being fixed in the housing while the sliding faces turn against one shoulder fixed to the shaft and a second, flexibly mounted shoulder. This arrangement allows axial forces in both directions to be taken up in a small space. The sliding faces of the thrust collar are provided with lubricating slots, tapered recesses and contact surfaces to which lubricating oil is supplied through a radial port from the outer circumference of the thrust collar to the inner circumference. The lubricating oil is distributed almost uniformly over the inner circumference and is conveyed to the tapered recesses and contact surfaces by way of lubricating slots in both sliding faces. After leaving the sliding faces it flows to an oil cooler, and having been cooled and cleaned, returns to the bearing.

A disadvantage of this kind of bearing is the rigidity of the thrust collar in the housing, i.e., the shaft cannot deflect through a small angle without causing a one-sided load on the sliding faces. As a consequence of this, the lubricating gap at the point of greatest distance between shoulder and collar is too large, and is eliminated at the point the two parts are pressed together. Damage to the bearing is thus unavoidable, or alternatively the operating range of the bearing is restricted. A further disadvantage is that the axial resilient mounting is on the shaft, because in the event of non-uniform displacement of the moving shoulder the shaft is loaded by an imbalance which also seriously impairs the performance of the bearing.

When plain bearings, including those with axial and radial sliding faces, are employed in practice, the sliding faces are subjected to high specific loadings, thus resulting in small lubricating gaps the load-bearing capacity of which is reduced, or at least limited, on the one hand by the influence of heat on the oil viscosity and the shape of the bearing, and on the other hand when the shaft deflects by even a very small amount. The oil temperatures have a great influence on the different sliding faces. In the known plain bearing of the kind referred to, oil of almost the same temperature is supplied to the two sliding faces. But this is unfavorable in the case of bearings which are loaded axially in principally one direction, since the sliding face on the unloaded side is then supplied with virtually fresh oil. The loaded face is then either supplied inadequately with lubricating oil, or this face must be made oversize and fed with additional oil, resulting in a higher consumption of lubricating oil.

The bearing body is deformed by the non-uniform thermal load imposed by the heat from the oil and due to friction, and this reduces the loading capacity of the sliding faces.

The object of the present invention is to avoid the disadvantages stated above and to create a hydrodynamic combined radial and axial bearing with radial damping which is suitable for passing through critical speeds.

This object is achieved in that the invention possesses the following distinguishing features:

a. the bearing disc is elastically supported on the housing by axially sprung elements, b. the bearing disc is rigidly located in a sleeve, this sleeve being fixed to the housing by way of a radially elastic support ring, c. the bearing disc is located in the axial direction close to and between two collars fixed rigidly to the shaft and provided with an axial clearance relative to opposite sides of the bearing disc, d. lubricating oil is fed through ports into the lubricating gap of the loaded first axial thrust bearing, after which it passes into the lubricating gap of the plain radial bearing located between the contact surface of the shaft and the bearing disc, and leaves by way of the unloaded second axial thrust bearing between the second collar and the bearing disc.

The advantages of the invention are that the loading capacity is increased by reason of the cool fresh oil, and the oil consumption is reduced. This arises from the fact that, for all practical purposes, the lubricating oil passes over the sliding faces in series, such that the heated oil leaving the loaded axial thrust bearing ensures a sufficient load-carrying capacity in the less loaded plain radial bearing and the unloaded axial bearing at the second collar.

Furthermore, this construction completely eliminates the severely asymmetrical temperature distribution, and hence conical deformation, at the bearing disc because only fresh oil is supplied to the loaded sliding faces, and only heated oil to the unloaded faces. This has a compensating effect since, on the one hand, the large quantity of heat due to friction is quickly dissipated from the loaded faces and, on the other hand, the heat is absorbed at the unloaded faces, which previously were relatively cool, without influencing the load-carrying capacity.

A further advantage applies in the case of shafts whose axes no longer coincide with the prescribed axis in the housing owing to deformation during service or machining tolerances, and consists in the fact that the sliding faces of the collars and the shaft always remain plane parallel to the sliding faces of the bearing disc. In this way the relatively narrow lubricating gap, as occurs with plain bearings of high specific loading, is not affected and can thus provide the necessary load-carrying capacity under all operating conditions. This advantage can also be utilized in the case of shafts running in the region of the critical speeds of a shaft string.

In one form of the invention the bearing disc is supported on the housing in the axial direction by a disc spring of U-shaped profile, such that the diameter of the supporting edge is as small as possible. This offers the advantage that the stiffness of the support is small with respect to the amount of deflection, but large in relation to the axial force. The bearing disc can therefore easily follow deflection of the shaft without the lubricating gap of the loaded axial bearing becoming irregular.

A reducing ring can also be fitted between the bearing disc and the axially acting spring in a similar manner to a tilting-pad bearing. The diameter of the supporting edge of this ring corresponds approximately to the outer diameter of the unloaded collar, at least at the end adjacent to the bearing disc.

In one form of the invention, the radially elastic ring connecting the sleeve to the housing comprises sprung rings in the form of concentric split cylindrical metal sheets provided with projections at their free ends. One of the advantages of this arrangement is that simple components are used to form a radially elastic connection between the housing and the bearing disc which allows compensating movement both when passing through the critical speed and when the shaft deflects, the properties of the sprung rings providing a damping effect.

A further advantage of supporting the disc elastically on the housing is that the non-uniform mass distribution caused when the shaft deflects remains ineffective as the irregular distribution exerts no influence owing to the non-moving parts.

Figure 2:
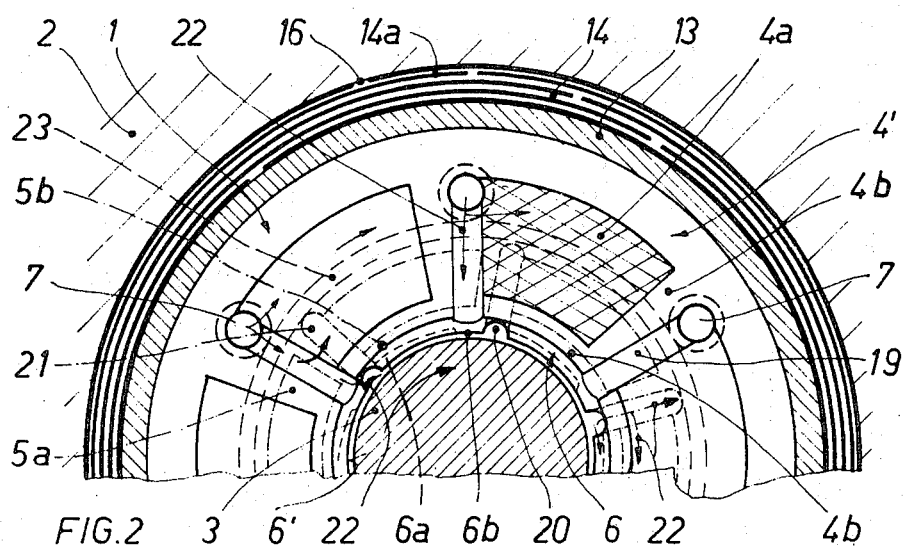

The invention will now be explained in more detail with reference to the accompanying drawings, in which:

FIG. 1 shows a longitudinal section through a bearing in a high speed turbocharger, and FIG. 2 is a cross-section along the line A—A in FIG. 1, and viewed in the direction of the arrows.

In FIG. 1 there is shown, in longitudinal section, a part of the housing 2 of a turbocharger in which a bearing for shaft 3 is located. The housing 2 is provided with a housing cover 2a and a bearing cover 2b which are bolted to the housing. The bearing cover 2b has a projection 26 on which the bearing disc 1 rests unattached in the axial direction. The bearing cover 2b also incorporates a ring seal 27, which here is in the form of a contact-type seal, for example, and prevents the escape of lubricating oil between shaft 3 and housing 2.

The shaft 3 is shown in the region of the bearing and its surface includes a number of steps in diameter, one of which forms the collar 8 for the axial, i.e., the thrust bearing 4 of the segmented type. The contact surface 9 for the radial plain bearing 6 is adjacent to this and is bounded by the collar 10 surrounding the next step. This collar is fixed to shaft 3 with a key 11 and spring nut 12.

The bearing disc 1 is pressed into sleeve 13, the elastic radial connection to the housing 2 being formed by the spring assembly 14 which comprises a number of concentric cylindrical metal sheets 14a each split at 16 with projections 15 at their free ends. These projections engage in recesses 25 in housing 2 to prevent the cylindrical sheets 14a from rotating.

The bearing disc 1 is provided with ports 7 through which lubricating oil 22 is fed from inlet 18 to sliding face 4' of thrust bearing 4, which is loaded axially under operating conditions, and builds up pressure at the tapered recesses 4a.

The inner peripheral surface of bearing disc 1 is provided with the sliding face 6' of radial bearing 6 which functions together with the sliding face 9 of shaft 3. The sliding face 6' is provided with tapered recesses 6a, contact surfaces 6b and lubricating slots 20 so that here, too, a hydrodynamic cushion of oil builds up in the lubricating gap.

The second radial surface of bearing disc 1 incorporates the sliding face 5', not loaded during operation, of thrust bearing 5. This face 5' is provided with tapered recesses 5a and contact surfaces 5b as well as lubricating slots 21 in the same way as the other sliding faces 4 and 5. The sliding face 5' of thrust bearing 5, which is not loaded during operation, is enclosed by a reducing ring 23, of which the inside diameter at the supporting edge 24 is approximately the same as the minimum outside diameter of collar 10. It is enlarged only sufficiently to allow the oil to drain from the bearings unobstructed.

The other end of reducing ring 23 rests unattached against bearing disc 1, the inside diameter of this end being determined by the largest outside diameter of collar 10 and the gap required for the drain oil. The supporting edge 24 of reducing ring 23 incorporates a key which engages in a U-shaped disc spring 17. This spring 17 is in turn fixed in position by means of a centering device on housing 2 or housing cover 2a.

FIG. 2 shows a cross section through the bearing. The reference symbols are the same as those used for the corresponding parts of FIG. 1.

Housing 2 contains the concentric, split cylindrical metal sheets 14a which support sleeve 13 flexibly in the radial direction on the housing 2.

The sleeve 13 is pressed onto bearing disc 1, which forms the basic element of the thrust bearings 4 and 5, which act in both axial directions, and of the radial bearing 6 of shaft 3. The tapered recesses 4a and contact surfaces 4b can be seen on the visible sliding face 4'. Radial lubrication slots 19 lead from the ports 7, through which lubricating oil 22 is supplied, to the sliding faces 6' of radial bearing 6. This is similarly provided with tapered recesses 6a, contact surfaces 6b and lubricating slots 20 in order to build up hydrodynamic pressure in the lubricating gap.

For the sake of clarity, the not visible face 5' of thrust bearing 5, not loaded in normal operation, is not designated. The tapered recesses 5a, contact surfaces 5b and lubricating slots 21 are indicated with chain-dotted lines in order to distinguish them clearly from the outline of reducing ring 23, which is also not visible. This ring completely surrounds the unloaded thrust bearing 5, and is thus a form of partition in the flow path of the lubricating oil 22, as can be seen in FIG. 1.

The operating principle of the bearing will now be explained in more detail with reference to the two views. Lubricating oil 22 flows by way of inlet 18 into the space 25 and then through ports 7, arranged in spaced relation around the circumference to correspond to tapered recesses 4a to 6a, to the loaded thrust bearing 4. Owing to the high friction caused by the axial load, the cold oil is heated in the lubricating gap between sliding face 4' and collar 8, and flows via the tapered recesses 4a, contact surfaces 4b and lubricating slot 19 to the sliding face 6' of radial bearing 6.

The loads between surface 9 and the tapered recesses 6a and contact surfaces 6b of radial bearing 6' are small compared with those in the first part of the bearing 4, i.e., the already heated lubricating oil 22 is heated only slightly more, and loses none of the viscosity necessary to build up pressure and withstand the loads.

The same applies to the second thrust bearing 5, the sliding face 5' of which is subjected to no load during operation. This bearing is loaded briefly only in the event of load changes or when the machine decelerates, but at the same time the load on the main thrust bearing 4 is reduced. As a result the oil temperature of the lubricating oil flowing through bearings 4 and 6 in series is lower in front of the second thrust bearing 5 than in normal operating condition, which again benefits the load-carrying capacity. In this way, relatively cool oil is supplied automatically to whichever thrust bearing 4 or 5 is loaded under any operating conditions, and therefore the specific loading is improved. In practice, this means not only smaller bearings and savings in space, but also lower oil consumption. Furthermore, owing to the lower oil temperature and more uniform temperature distribution, materials of lower heat resistance can be used for the contact faces, thus reducing both manufacturing and operating costs.

Included in the area of the invention is the fact that the disc spring 17 can be replaced by plate springs or by helical springs arranged about the circumference, and that the radially elastic support device in the housing can be exchanged for a hydroelastic bellows.

As a variation of the illustrated embodiment, the radially elastic support device 14, 15 in housing 2 could also be formed from an elastomer which counteracts deflection of the shaft in the manner described.

It is further possible to replace the rigid annular cover 2a by a spring cover, of radial leaf springs, for instance, so that the function of disc spring 17 shown in the example can be combined with the support housing.

I claim:

1. A rotatable shaft structure and hydrodynamic combined thrust and radial bearing therefor comprising a bearing housing surrounding a shaft, an annular bearing disc surrounding said shaft and which is seated with axial clearance between two axially spaced collars on said shaft, first and second axial thrust bearings disposed on the faces of said collars for establishing a sliding contact with the opposite sides of said bearing disc, a sleeve surrounding and in contact with the outer periphery of said bearing disc, radially elastic means disposed between the outer periphery of said sleeve and said bearing housing for supporting said sleeve and bearing disc in a radially elastic manner, spring means supported within said bearing housing and which serve to apply an axial force to said bearing disc for loading it in the direction of said first thrust bearing, a radial bearing disposed between the inner periphery of said bearing disc and the shaft surface between said collars, and means establishing a flow path for oil to lubricate all of said bearings in series, the direction of oil flow being from an oil inlet in a radially inward direction through the lubricating gap established at said first thrust bearing, thence in an axial direction through the lubricating gap established at said radial bearing and thence in a radially outward direction through the lubricating gap established at said second thrust bearing.

2. A rotatable shaft structure and combined thrust and radial bearing therefor as defined in claim 1 wherein said spring means which apply an axial force to said bearing disc are constituted by plate springs.

3. A rotatable shaft structure and combined thrust and radial bearing therefor as defined in claim 1 wherein said spring means which apply an axial force to said bearing disc are constituted by an annular disc spring having a U-shaped profile and which surrounds said shaft.

4. A rotatable shaft structure and combined thrust and radial bearing therefor as defined in claim 3 and which further includes a reducing ring surrounding the collar correlated to said second thrust bearing and located between said bearing disc and said annular disc spring, the inner diameter of said reducing ring being slightly larger than the diameter of that collar to establish a part of the outflow path of the lubricating oil after leaving said second thrust bearing.

5. A rotatable shaft structure and combined thrust and radial bearing therefor as defined in claim 1 wherein said radially elastic means disposed between the outer periphery of said sleeve and said bearing housing is constituted by a hydroelastic ring.

6. A rotatable shaft structure and combined thrust and radial bearing therefor as defined in claim 1 wherein said radially elastic means disposed between the outer periphery of said sleeve and said bearing housing is constituted by an assembly of concentrically arranged split cylindrical metal sheets, the free ends of said sheets being provided with projections which engage in corresponding recesses provided in said bearing housing.

* * * * *

UNITED STATES PATENT OFFICE
CERTIFICATE OF CORRECTION

Patent No. 3,827,770    Dated August 6, 1974

Inventor(s) Hansulrich Horler

It is certified that error appears in the above-identified patent and that said Letters Patent are hereby corrected as shown below:

[73]   Assignee:   BBC BROWN BOVERI & COMPANY LIMITED
                   Baden, Switzerland Signed and sealed this 26th day of November 1974.

(SEAL)
Attest:

McCOY M. GIBSON JR.                C. MARSHALL DANN
Attesting Officer                  Commissioner of Patents